H. W. G. FRINK.
HOG OILER.
APPLICATION FILED SEPT. 14, 1916.
1,252,256.
Patented Jan. 1, 1918.
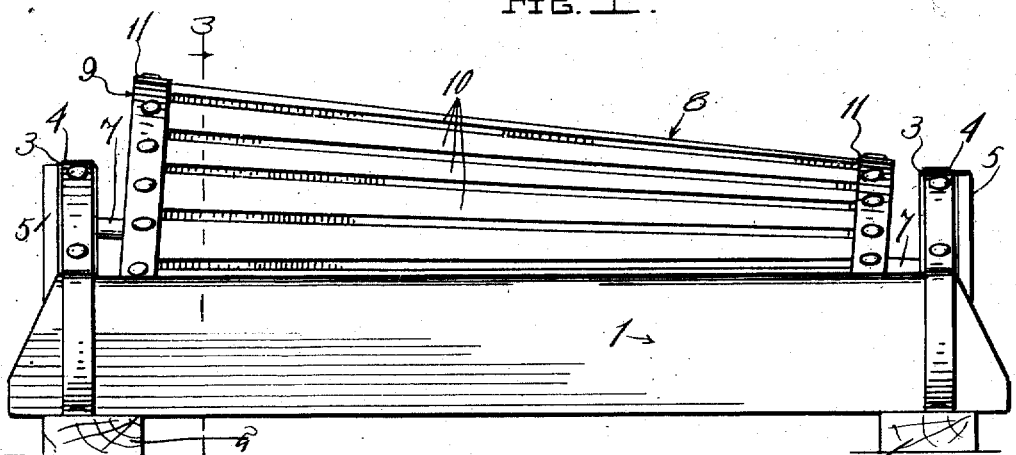
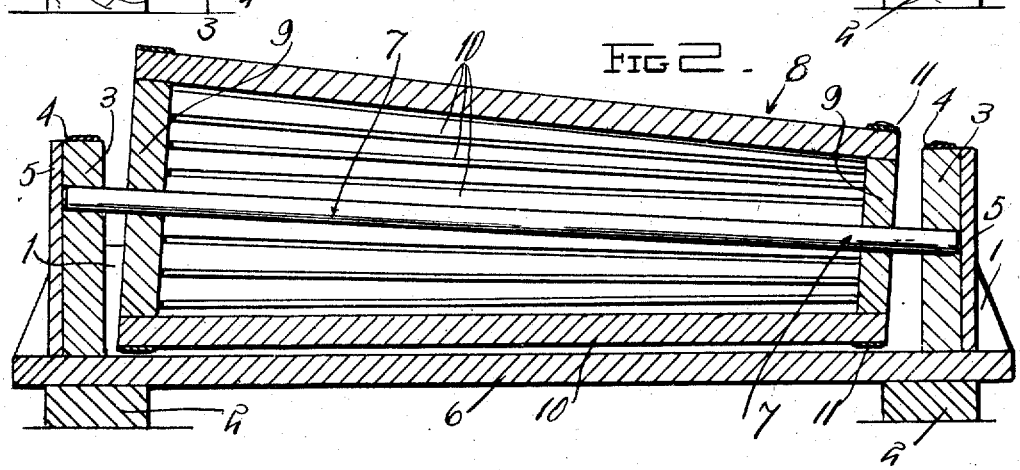
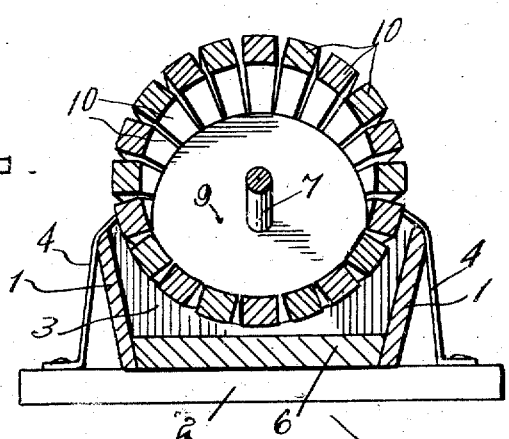
Inventor
H. W. G. Frink

UNITED STATES PATENT OFFICE.

HARVEY W. G. FRINK, OF CARROLL, NEBRASKA.

HOG-OILER.

1,252,256.  Specification of Letters Patent.  Patented Jan. 1, 1918.

Application filed September 14, 1916. Serial No. 120,103.

*To all whom it may concern:*

Be it known that I, HARVEY W. G. FRINK, a citizen of the United States, residing at Carroll, in the county of Wayne, State of Nebraska, have invented certain new and useful Improvements in Hog-Oilers; and I do hereby declare the following to be a full, clear, and exact description of the invention, such as will enable others skilled in the art to which it appertains to make and use the same.

This invention relates to a hog oiling apparatus, and has particular reference to a device which may be placed in a position where the hogs will have casual access thereto, and will automatically oil themselves by using the apparatus as a rubbing device.

The object of this invention is to provide an oiling apparatus for treating hogs, which will effect a suitable distribution of oil throughout a herd of hogs without the necessity of an attendant. To this end, my invention contemplates the provision of a receptacle which is located in the pen or other inclosure in which the hogs are allowed to run and which is provided with an element which is attractive to the hogs as a scratching or rubbing device, the element being movable within the receptacle under the action of the hogs rubbing thereagainst to distribute the contents of the receptacle onto the sides of the animals.

In providing such an apparatus, it is also my intention to provide a distributing element which is particularly adapted for providing an even distribution of the contents of the receptacle without causing the material to be too heavily coated upon the animals.

With the above object in view and such others as will hereinafter appear, my invention will now be fully set forth and described, reference being had to the accompanying drawings.

In the drawings,

Figure 1 is a side elevation of the device,

Fig. 2 is a vertical longitudinal section, and

Fig. 3 is a section on line 3—3 of Fig. 1.

Referring more particularly to the drawings, 1 denotes a comparatively long shallow trough which is mounted upon the transverse foot pieces 2 whose ends extend beyond the side of the trough to provide a substantial support which will prevent the trough 1 from being easily overturned. The ends 3 of the trough 1 rise above the sides thereof in the form of standards which are capped by means of the straps 4, said straps 4 consisting of strap iron which overlies the upper edges of the sides 3 and are carried to the foot pieces 2 in spaced relation to the sides of the trough so that suitable braces are thereby provided for additionally securing the sides to the ends 3. The outer faces of the sides 3 are furthermore reinforced by the vertical elements 5, which rise from the bottom 6 and are secured throughout their lengths against the ends 3. Journaled in the ends 3 are the ends of a shaft 7, one of the bearings being on a higher level than the other so that the shaft 7 is inclined slightly from one end to the other of the trough.

Rigidly mounted upon the shaft 7 is a drum 8. The drum 8 consists of the heads 9 of two sizes, the larger head being mounted upon the end of the shaft which has the higher bearing, and the heads are connected by means of the bars or slats 10 which are preferably substantially square in cross section and are furthermore tapered from the large head to the small head of the drum so that the bars may be fitted into comparatively close relation around the peripheral edge of the heads and provide therebetween slots whose sides converge toward the inner face of the bars. Thus, the spaces between the bars constitute cross sectionally tapered slots or recesses whose wider ends are coincident with the periphery of the drum, and whose inner ends communicate with the interior of the drum so that material which is caught in the spaces will not be held therein after the drum has been rotated to bring the spaces to the top of the drum, but they will be emptied into the body of the material contained in the trough. Furthermore, the squared edges of the bars provide scratching elements which not only induce the animals to rub thereagainst, but which work on the skin to more thoroughly rub the oil therein.

As above described, the drum supporting shaft 7 inclines from one end to the other of the trough, and the incline is of such pitch that the lower rim of the drum will lie substantially parallel with the bottom of the trough 1 so that when the oil in the trough is comparatively low, the drum will still be fed throughout its length, instead of merely at the larger end thereof. The heads 9 of the bar are surrounded by the hoops 11 which entirely surround the drum at the ends thereof and serve in securing the bars in their relative positions.

In operation, the device is placed in a field or other inclosure in which hogs are kept. The body of the trough is long and low, and is furthermore laterally sustained upon a low base by means of the foot pieces 2, and the trough 1 is filled with a suitable oil. The device with its slotted or grooved drum is attractive to hogs as a rubbing or scratching device. By rubbing themselves against the drum they obviously rotate the latter within the trough and the V-shaped grooves or slots formed between the bars 10 retain a suitable quantity of oil which is just sufficient to coat the sides of the hogs as they continue to rub against the drum. It is obvious that there will be no waste of the oil, since the perforated or slotted character of the drum permits the surplus oil to run into the interior of the drum. The feed of the oil to the drum is either from the interior or exterior of the drum when the trough is full, or from the outside of the drum when the level of the oil in the trough is at such a low level that it does not find its way into the interior of the drum from the trough. It is also evident that the trough need only be filled at the ends of comparatively long periods since the space within the trough as well as the space within the drum below the edge of the trough will hold oil which may be distributed to the animals, and that the feed of oil is gradual, only that part which adheres to the bars 10, being rubbed upon the sides of the animals. By reason of tapered formation of the drum, also, the hogs may reach the top of the drum at its smaller end in order to rub their noses, chins and necks thereover, thus permitting them to cover substantially their entire bodies.

It should be furthermore noted that the present device is capable of being constructed from wood, sheet-metal, cast iron or concrete.

What I claim is:—

A hog oiling apparatus, comprising in combination, a trough, a drum rotative in said trough, and having a portion of its periphery extending above the walls of the trough, said drum consisting of a large head, a small head and longitudinal bars connecting said heads in comparatively close spaced relation, said bars being formed of cross sectionally squared elements which provide scratching edges along their outer side.

In testimony whereof, I affix my signature, in the presence of two witnesses.

HARVEY W. G. ERINK.

Witnesses:
LUCIAN W. CARTER,
DANIEL DAVIS.

Copies of this patent may be obtained for five cents each, by addressing the "Commissioner of Patents, Washington, D. C."